United States Patent
Park et al.

(10) Patent No.: US 11,144,718 B2
(45) Date of Patent: Oct. 12, 2021

(54) ADAPTABLE PROCESSING COMPONENTS

(71) Applicant: International Business Machines Corporation, Armonk, NY (US)

(72) Inventors: Youngja Park, Princeton, NJ (US); Siddharth A. Patwardhan, Ridgewood, NJ (US)

(73) Assignee: International Business Machines Corporation, Armonk, NY (US)

(*) Notice: Subject to any disclaimer, the term of this patent is extended or adjusted under 35 U.S.C. 154(b) by 967 days.

(21) Appl. No.: 15/444,734

(22) Filed: Feb. 28, 2017

(65) Prior Publication Data

US 2018/0247221 A1 Aug. 30, 2018

(51) Int. Cl.
*G06N 20/00* (2019.01)
*G06F 40/20* (2020.01)

(52) U.S. Cl.
CPC ............. *G06F 40/20* (2020.01); *G06N 20/00* (2019.01)

(58) Field of Classification Search
CPC ...... G06N 3/0454; G06N 3/084; G06N 20/20; G06F 17/27
See application file for complete search history.

(56) References Cited

U.S. PATENT DOCUMENTS

| | | |
|---|---|---|
| 2008/0050014 A1 | 2/2008 | Bradski et al. |
| 2015/0161106 A1 | 6/2015 | Barbetta et al. |
| 2015/0235130 A1* | 8/2015 | Contreras ............. G06F 16/243 706/11 |
| 2015/0339574 A1* | 11/2015 | Allen .................. G06F 16/2365 706/11 |
| 2016/0078359 A1* | 3/2016 | Csurka ................. G06K 9/6215 706/12 |
| 2016/0217389 A1 | 7/2016 | Cordes et al. |
| 2016/0342895 A1 | 11/2016 | Gao et al. |
| 2017/0024427 A1 | 1/2017 | Daly et al. |
| 2019/0188566 A1* | 6/2019 | Schuster .................. G06N 3/08 |
| 2019/0325308 A1* | 10/2019 | Chung .................... G06F 40/44 |

FOREIGN PATENT DOCUMENTS

| | | |
|---|---|---|
| CN | 101136020 A | 3/2008 |
| CN | 105302884 A | 2/2016 |
| CN | 105955709 A | 9/2016 |

(Continued)

OTHER PUBLICATIONS

Schuster et. al., "Reward Augmented Maximum Likelihood for Neural Structured Prediction", Jan. 2017 (Year: 2017).*

(Continued)

*Primary Examiner* — Li B. Zhen
*Assistant Examiner* — Selene A. Haedi
(74) *Attorney, Agent, or Firm* — John Noh; Edell, Shapiro & Finnan, LLC

(57) ABSTRACT

In configuring a processing system with an application made up of machine learning components, where the application has been trained on a set of training data, the application is executed on the processing system using another set of training data. Outputs of the application produced from the other set of training data identified that concur with ground truth data are identified. The components are adapted to produce outputs of the application that concur with the ground truth data using the identified outputs of the application.

19 Claims, 9 Drawing Sheets

(56) References Cited

FOREIGN PATENT DOCUMENTS

| | | |
|---|---|---|
| JP | H05-54068 A | 3/1993 |
| JP | 2006-163623 A | 6/2006 |
| JP | 2013-250926 A | 12/2013 |
| JP | 2014-120053 A | 6/2014 |
| JP | 2016-024600 A | 2/2016 |

OTHER PUBLICATIONS

PCT International Search Report and Written Opinion of the International Searching Authority dated Apr. 16, 2018, 11 pages.
UK Examination Report in counterpart Great Britain Application No. GB1913722.3, dated Oct. 31, 2019, 6 pages.
English Translation of Notice of Reasons for Refusal in counterpart Japanese Patent Application No. 2019-545255, dated Jun. 23, 2021, 4 pages.

* cited by examiner

ADAPTABLE PROCESSING COMPONENTS

BACKGROUND

1. Technical Field

Present invention embodiments relate to machine learning, and more specifically, to adapting individual machine learning components in various application environments.

2. Discussion of the Related Art

Machine learning is a field of computer science by which computer processing systems can learn without explicit programming. Machine learning is employed in a range of computing tasks where designing and programming explicit algorithms is infeasible; example applications include, without being limited to, network security, spam filtering, optical character recognition (OCR), search engines, computer vision and natural language processing (NLP). A core objective of a machine learning component, or "learner," is to generalize from its experience, to perform accurately on new, unseen examples/tasks after having experienced a learning data set. Training examples may be provided that are considered representative of the space of occurrences and the learner builds a general model about this space that enables it to produce sufficiently accurate predictions in new cases.

Certain computer processing systems and the applications and tasks performed thereon comprise many components, one or more of which may be learners. In some systems, each of the learners must be trained separately from each other as well as separately from the training of the system overall. Modern large-scale NLP applications, for example, consist of many individual machine learning-based components that are conventionally trained apart from one another and apart from the application in which they are used. When a new domain and/or a new genre of text is introduced to the application, the application needs to be retrained with new training data to maintain accuracy in the new domain. Each NLP component within that application must be individually trained or manually adapted for that domain and/or genre. Obtaining training data for such NLP components for new domains is extremely expensive, requiring input from human experts in that domain. Retraining each and every NLP component in a large application becomes prohibitively expensive and in some cases is neglected at the cost of application accuracy.

SUMMARY

Embodiments of the present invention overcome the foregoing deficiencies in the technology by using feedback from the application itself to adapt and train the NLP components of the application as opposed to retraining each component individually.

The present invention may be a system, a method, and/or a computer program product for configuring a processing system with an application utilizing a plurality of machine learning components, where the application has been trained on a set of training data, the application is executed on the processing system using another set of training data. Outputs of the application produced from the other set of training data are identified that concur with ground truth data are identified. The components are adapted to produce outputs of the application that concur with the ground truth data using the identified outputs of the application.

Optionally, a first number of candidate outputs may be generated from each of the components. A component model is trained for each of the components by executing the application for each of the first plurality of candidate outputs generated from that component. The component model is adjusted based on results produced by the application. The application is executed with the trained component model for each of the plurality of components by generating a second number of candidate outputs from each component. The trained component model for each component is applied to select a candidate output for that component from among the second number of candidate outputs generated from that component. The application is executed utilizing the selected candidate output for each of the components.

Optionally, generating the first number candidate outputs may include generating the first number of candidate outputs as variations of a primary candidate output.

Optionally, features may be determined for the first number candidate outputs generated from each of the components and the component model for each of the components may be trained by weighting the features of each of the first number candidate outputs generated from that component based on results produced by the application to enable the selection of a candidate output for the application.

Optionally, a component model may be trained for a set of the components by executing the application with one from each of the first number of candidate outputs generated from the set of components. The component model may be adjusted for the set of components based on results produced by the application. The application is executed with the trained component model for the set of components.

Optionally, the component model may be trained based on output from the application in response to a new domain for the application.

Optionally, training the component model includes measuring accuracy of execution of the application for each of the first number of candidate outputs and adjusting the corresponding component model based on the accuracy. Weighting the features may include increasing the weighting for features associated with a candidate output producing a high accuracy and decreasing the weighting associated with a candidate output producing a low accuracy.

The foregoing is a summary and thus contains, by necessity, simplifications, generalizations and omissions of detail; the summary is illustrative only and is not intended to be in any way limiting. Other aspects, inventive features and advantages of the present invention, as defined solely by the claims of the subject patent application, will become apparent from the non-limiting detailed description below.

BRIEF DESCRIPTION OF THE DRAWINGS

Generally, like reference numerals in the various figures are utilized to designate like components.

DETAILED DESCRIPTION

To provide training to natural language processing (NLP) components for use in a different domain, genre or application, embodiments of the invention provide techniques by which the components are trained using information obtained during the training of the application, as opposed to training each individual component separately. The term "application," as used herein, refers to processing hardware under control of processor instructions (software) that performs one or more tasks, usually in response to user input. This definition is intended to be in keeping with common usage of the term in computer-related fields. Embodiments of the present invention provide means by which components of an application utilizing machine learning, e.g., an NLP application, can be retrained to accommodate new domains of discourse and/or to be used in other machine learning applications. It is to be understood that the present invention is an improvement in machine learning itself, which, by definition, is a "computer-related technology." The improvements described herein allow computer performance of natural language and other machine learning functionality not previously performed by computer-implemented machine learning systems.

Figure 1:
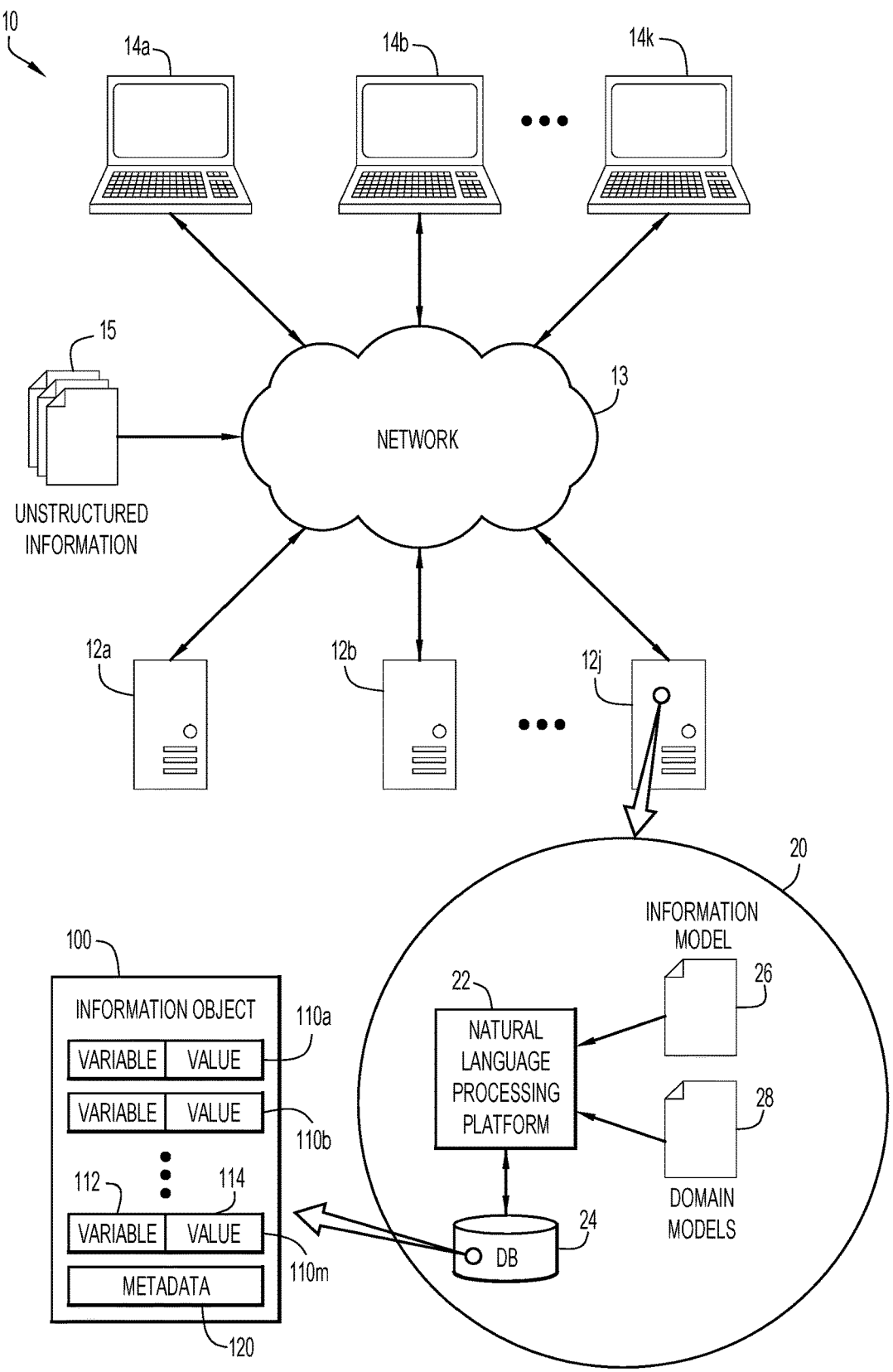
FIG. 1 illustrates an example environment in which the present invention can be embodied.

An example environment for present invention embodiments is illustrated in FIG. 1 as network infrastructure 10. As is illustrated, the environment includes one or more server systems 12a-12j, representatively referred to herein as server system(s) 12, and one or more client or end-user systems 14a-14k, representatively referred to herein as client system(s) 14. Server systems 12 and client systems 14 may be remote from each other and may communicate over a network 13. Network 13 may be implemented through any number of suitable communications media, e.g., metallic conductors, optical fiber, air, etc. using one or more signaling techniques and possibly in accordance with one or more standardized communication protocols, e.g., Internet Protocol (IP), Transport Control Protocol (TCP), User Datagram Protocol (UDP), etc. Network 13 may be supported by suitable hardware components to implement wide area networks (WAN), local area networks (LAN), internets, intranets, etc. Alternatively, server systems 12 and client systems 14 may be sufficiently local to each other to communicate through direct or line-of-sight techniques, e.g., wireless radio links, fiber-less optical links, etc. In certain implementations, services and functionality of server systems 12 and those of client systems 14 may be performed by common circuitry and shared computational resources in a single device, such as a workstation.

Server systems 12 and client systems 14 may be implemented by any conventional or other computer system preferably equipped with a display or monitor, a base (e.g., including at least one processor (not illustrated), one or more memories (not illustrated)), internal or external network interfaces or communications devices, e.g., modem, network cards, etc. (not illustrated), optional input devices, e.g., a keyboard, mouse or other input device, and any commercially available, open-source and custom software, e.g., operating system, server/communications software, browser/interface software, etc.

One or more client systems 14 and/or one or more server systems 12 may be constructed or otherwise configured to implement an information technology infrastructure (ITI) 20. ITI 20 represents a unified framework by which enterprise data are collected, stored, retrieved and managed. ITI 20 may implement, among other things, an NLP platform 22. NLP platform 22 represents a machine framework that supports NLP applications, such as those indicated above.

NLP platform 22 may collect and process unstructured input text, representatively illustrated at unstructured text 15, in accordance with an established information model 26 so that the processed data may be integrated into the information scheme of ITI 20. An "information model," as used herein, represents the linguistic concepts for each domain of discourse realized in ITI 20, as well as the relationships between those concepts, constraints, rules, and operations by which textual content is construed to derive its underlying semantics. Information model 26 may encompass multiple ontologies, where an "ontology," as used herein, is a specification of linguistic entities by which meaning is conveyed between agents in a domain of discourse. An ontology includes, without being limited to, the lexicography, morphologies, grammatical and syntactical rules, special patterns of text, etc., for the domain of discourse. Ontologies may include local and/or general ontologies, which may specify general language and enterprise-internal linguistic entities, and domain-specific ontologies, which specify linguistic entities of highly-specialized domains of discourse, e.g., those having idiosyncratic vocabularies and/or morphologies, such as in the fields of healthcare, law, finance, scientific research, etc. The present invention is not limited to a specific technique in which ontologies are realized in an information technology infrastructure 20. Upon review of this disclosure, those having skill in computational linguistics will recognize different techniques by which ontologies may be realized in particular information integration applications without departing from the spirit and intended scope of the present invention.

As illustrated in FIG. 1, ITI 20 may implement a database (DB) 24, in which structured information, such as information object 100, is stored. Various models described herein, e.g., information models, domain models, ranking models, etc., may also be stored in DB 24. The present invention is not limited to specific implementations of DB 24; upon review of this disclosure, those having skill in information technology will recognize numerous structured information storage techniques that can be used in conjunction with the present invention without departing from the spirit and intended scope thereof.

Information object 100 is an example data structure with which certain embodiments of the invention carry computer-readable information regarding some object or entity through the various natural language processing operations. It is to be understood while a single information object 100 is illustrated in FIG. 1, DB 24 may comprise billions of information objects 100 each of varying size and containing various informative data.

Information object 100 may, among other things, represent a stored state of the object being represented by information object 100. Attributes 110 may include respective variables, representatively illustrated at variable 112, and respective values assigned to those variables, representatively represented in FIG. 1 as value 114. The present invention is not limited to particular ways of representing objects in computer-readable form; information object 100 is but one example. Moreover, it is to be understood that value 114 is not restricted to the representation of numerical or textual values. For example, value 114 may contain a pointer, link or reference to other information objects 100 (e.g., a sentence information object containing references to word information objects from which the sentence is composed). The present invention is not limited to a particular set of attributes that can be represented in information object 100.

Metadata 120 represents various other information about the object being represented. For example, metadata 120 may contain computer-readable information about attributes 110, e.g., what the represented state would mean to a human, what values assigned to individual variables mean to a human, etc. Metadata 120 may also contain computer-readable information pertaining to the data processing itself, including runtime and training information. Other information can be represented in metadata 120 as well, as those skilled in natural language processing and database technology will appreciate.

NLP applications may be trained through domain models 28 that represent domain-specific knowledge. Such domain-specific knowledge may include, for example, background data, rules, formulas, transforms, constants, etc. by which each processing stage of the application produces that stage's output information objects 100 from that stage's input information objects 100. For example, in the healthcare domain, domain models 28 realize methodology by which a certain medical diagnosis is derived from gathered data, e.g., medical history, laboratory results, physicians' notes, etc. Various processing stages or components of NLP platform 22 may insert new attributes 110 into information objects 100, such as in response to computing a mathematical formula, processing text, etc., in accordance with a domain model 28, may assign values 114 to variables 112 including numbers, text, images, video, hyperlinks, etc., based on the processing functionality of the application as defined by domain model 28.

Figure 2A:
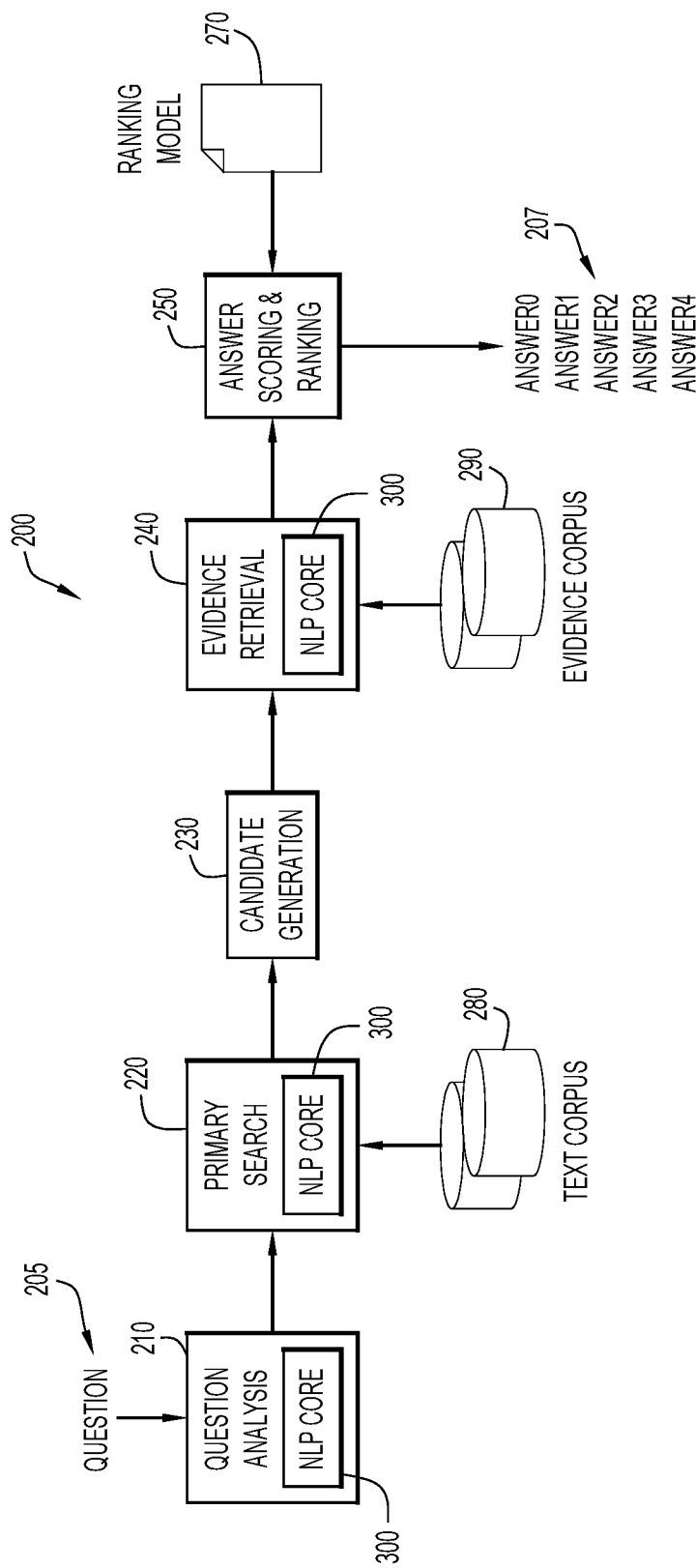
FIGS. 2A-2B are schematic block diagrams of an example NLP application comprising adaptable components by which the present invention can be embodied.
Figure 2B:
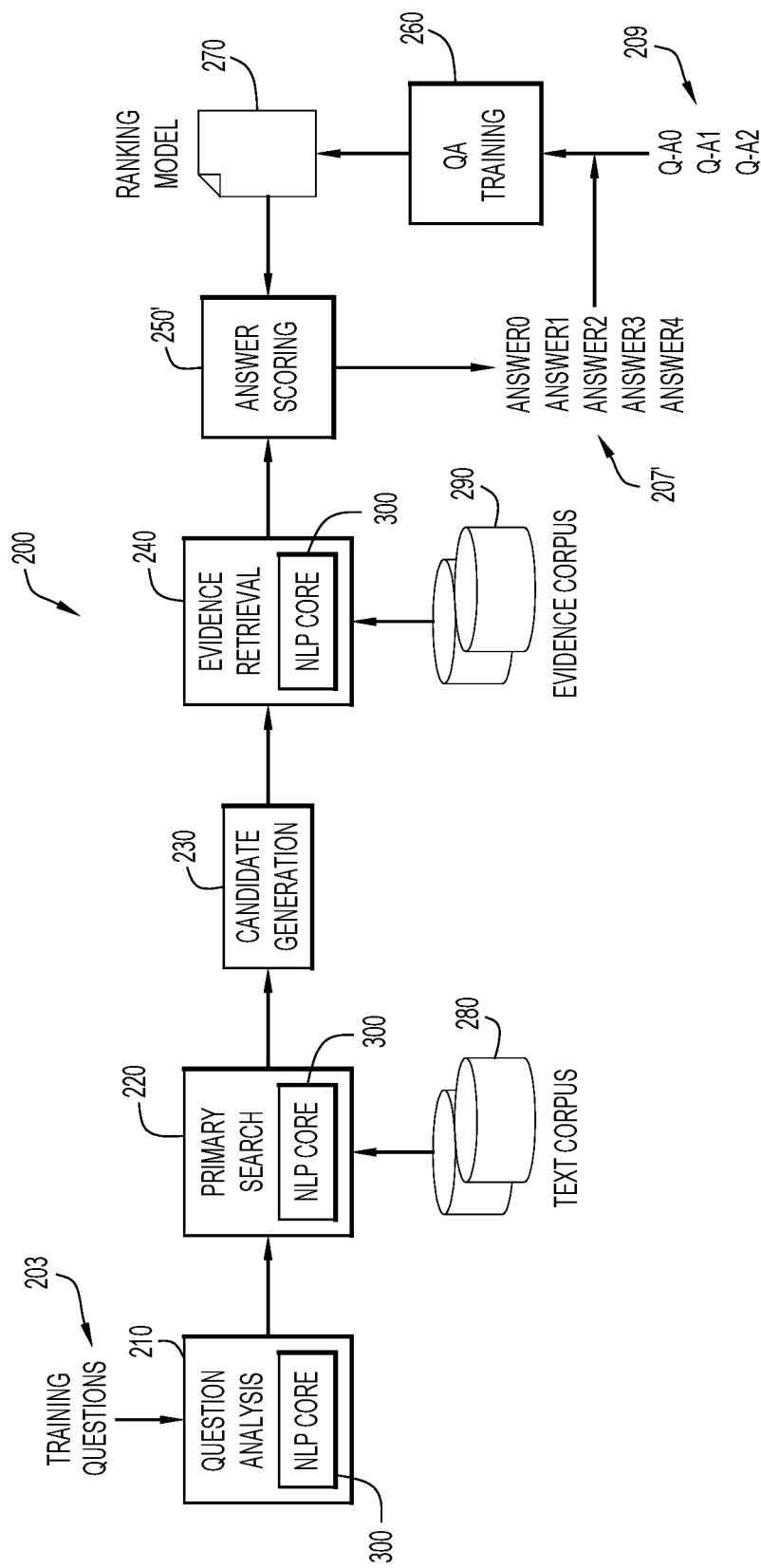

FIGS. 2A and 2B, collectively referred to herein as FIG. 2, are schematic block diagrams of an example question-answer (QA) system 200 executing under or otherwise supported by NLP platform 22. QA system 200 may be constructed or otherwise configured to generate answers (conclusions) to user-selected questions (lines of inquiry) using natural language processing, cognitive processing, machine learning and machine reasoning techniques. FIG. 2A depicts the runtime configuration of QA system 200 and FIG. 2B depicts the training configuration of QA system 200.

NLP processing platform 22 may afford instantiation of and/or application support (application programming interface, for example) to an NLP core 300 that may be used in different components of an NLP application, such as QA system 200. In certain embodiments, NLP core 300 and/or components thereof may be adapted to new domains of discourse and/or to new applications under NLP platform 22 without the need for training the components of NLP core 300 individually. An example NLP core 300 is discussed in detail below with reference to FIG. 3.

As illustrated in FIG. 2A, a question 205 for which an answer is sought may be introduced into QA system 200 at runtime, such as through a user interface of the NLP application. Question 205 may be a dynamic user-constructed database query and/or may be previously established line(s) of inquiry designed to generate standard and/or usual output products (answers).

Question analysis stage 210 may determine the nature of question 205 and may employ question classification techniques that identify question types or parts of questions that require special processing. Question analysis stage 210 may also identify a word or noun phrase in the question that specifies the information type of the question's answer, referred to herein as a lexical answer type (LAT). Candidate answers can later be scored by a confidence metric as to whether a candidate answer is considered an instance of the LAT.

Primary search stage 220 performs a search of a text corpus 280 for information relating to question 205. Text corpus 280 may contain information related to the target domain, e.g., information that describes or is otherwise indicative of the kinds of questions that arise in a particular problem space (e.g., healthcare, finance, etc.). Primary search stage 220 may conduct a search over text corpus 280 to find as much potentially answer-bearing content as possible based on the results of question analysis stage 210. Primary search stage 220 may realize a variety of search techniques, including the use of multiple text search engines with different underlying approaches, document search as well as passage search, knowledge base search, the generation of multiple search queries for a single question and others.

Candidate generation stage 230 uses the results generated by primary search stage 220 to produce candidate answers to question 205. Candidate generation stage 230 may employ techniques appropriate to the kind of search results retrieved. For example, in the case of document search results from "title-oriented" resources, the title may be extracted as a candidate answer. The system may generate a number of candidate answer variants from the same title based on substring analysis or link analysis (if the underlying source contains hyperlinks). Passage search results require more detailed analysis of the passage text to identify candidate answers. For example, named entity detection may be used to extract candidate answers from the passage. Some sources, such as a triple store and reverse dictionary lookup, produce candidate answers directly as their search result.

In evidence retrieval stage 240, candidate answers undergo a rigorous evaluation process that involves gathering additional supporting evidence for each candidate answer and applying a wide variety of deep scoring analytics to evaluate the supporting evidence. Evidence is information by which a candidate answer is supported or refuted. For example, if a candidate answer is similar in structure, context and semantics as other usage examples gathered as evidence, there is a greater confidence in the answer being correct. If there are no (or few) usage examples that match the candidate answer, the confidence in the candidate would be lower.

Embodiments of the invention may implement a variety of evidence-gathering techniques on a variety of sources, representatively illustrated at evidence corpus 290. An example technique performs a passage search in primary search stage 220 in which the candidate answer is added as a required term in the search query derived from the question. This will retrieve passages that contain the candidate answer in the context of the original question terms. Supporting evidence may also come from other sources like triplestores. The retrieved supporting evidence may be subjected to deep (precisely targeted) evidence scoring operations, which evaluate the candidate answer in the context of the supporting evidence.

Answer scoring and ranking stage 250 performs scoring algorithms that determine the degree of certainty that a candidate answer is correct based on the evidence retrieved by evidence retrieval stage 240. QA system 200 may support many different scoring techniques that consider different dimensions of the evidence and produce a score that corresponds to how well evidence supports a candidate answer for a given question. Such scoring techniques may range from formal probabilities to counts to categorical features, based on evidence from different types of sources. The scoring techniques may consider things like the degree of match between a passage's predicate-argument structure and the question, passage source reliability, geospatial location, temporal relationships, taxonomic classification, the lexical and semantic relations the candidate is known to participate in, the candidate's correlation with question terms, its popularity (or obscurity), its aliases, and so on.

Consider the question, "who was presidentially pardoned on Sep. 8, 1974," which is correctly answered, "Nixon," which is one of the generated candidate answers. One of the retrieved passages used as evidence may be "Ford pardoned Nixon on Sep. 8, 1974." An example passage scorer may count the number of inverse document frequency (IDF)-weighted terms in common between the question and the passage. Another passage scorer may measure the lengths of the longest similar subsequences between the question and passage. A third type of passage scoring measures the alignment of the logical forms of the question and passage. A logical form is a graphical abstraction of text in which nodes are terms in the text and edges represent either grammatical relationships, deep semantic relationships, or both. In the example above, the logical form alignment identifies Nixon as the object of the pardoning in the passage, and that the question is asking for the object of a pardoning. Logical form alignment gives "Nixon" a good score given this evidence. In contrast, a candidate answer like "Ford" would receive near identical scores to "Nixon" for term matching and passage alignment with this passage, but would receive a lower logical form alignment score.

Other types of scorers use knowledge in triplestores, simple reasoning such as subsumption and disjointness in type taxonomies, and geospatial and temporal reasoning. Geospatial reasoning may be used to detect the presence or absence of spatial relations such as directionality, borders, and containment between geoentities. For example, if a question asks for an Asian city, then spatial containment provides evidence that Beijing is a suitable candidate, whereas Sydney is not. Similarly, geocoordinate information associated with entities may be used to compute relative directionality (for example, California is SW of Montana; GW Bridge is N of Lincoln Tunnel, and so on).

Temporal reasoning may be used to detect inconsistencies between dates in the evidence and those associated with a candidate answer. For example, the two most likely candidate answers generated for the question, "who took a job as a tax collector in Andalusia in 1594," are "Thoreau" and "Cervantes." In this case, temporal reasoning is used to rule out Thoreau as he was not alive in 1594, having been born in 1817, whereas Cervantes, the correct answer, was born in 1547 and died in 1616.

Answer scoring and ranking stage 250 may evaluate hundreds of candidate answers based on potentially hundreds of thousands of scores to identify the single best-supported candidate answer given the evidence. A confidence in a particular candidate answer may be estimated, i.e., the likelihood that the particular answer is correct. Since multiple candidate answers for a question may be equivalent despite very different surface forms, answer merging may be applied by answer scoring and ranking stage 250 to avoid conflicts in ranking techniques that utilize relative differences between candidates. Without such answer merging, ranking algorithms might compare multiple surface forms that represent the same answer in an attempt to discriminate among them. However, different surface forms are often disparately supported in the evidence and result in radically different, though potentially complementary, scores. Embodiments of the invention apply an ensemble of matching, normalization, and coreference resolution algorithms, by which equivalent and related hypotheses (for example, Abraham Lincoln and Honest Abe) are identified.

As illustrated in FIG. 2, QA system 200 includes a ranking model 270 in accordance with which candidate answer are ranked and confidences are estimated based on their merged scores. Embodiments of the invention implement machine-learning techniques that operate over a set of training questions with known answers to train a ranking model 270 based on the scores.

Training ranking model 270 may be achieved by machine-learning techniques involving running the system over a set of training questions 203 with known answers. The set of training questions 203 and the respective known answers may serve as ground truth data 209. As illustrated in FIG. 2B, training questions 203 may be provided to QA system 200 in training mode. Training questions 203 may be processed by QA system 200 in a manner substantially identical to that described with reference to the runtime mode illustrated in FIG. 2A. However, answer scoring stage 250' foregoes candidate answer ranking and provides scored answers 207' at its output. Scored answers 207' are provided to a QA training stage 260 that applies machine learning techniques to construct ranking model 270 based on the answer scores and ground truth data 209. The present invention is not limited to a particular machine learning technique utilized by QA training stage 260. Upon review of this disclosure, those having skill in machine learning may recognize various techniques that may be used in conjunction with the present invention without departing from the spirit and intended scope thereof.

Figure 3:
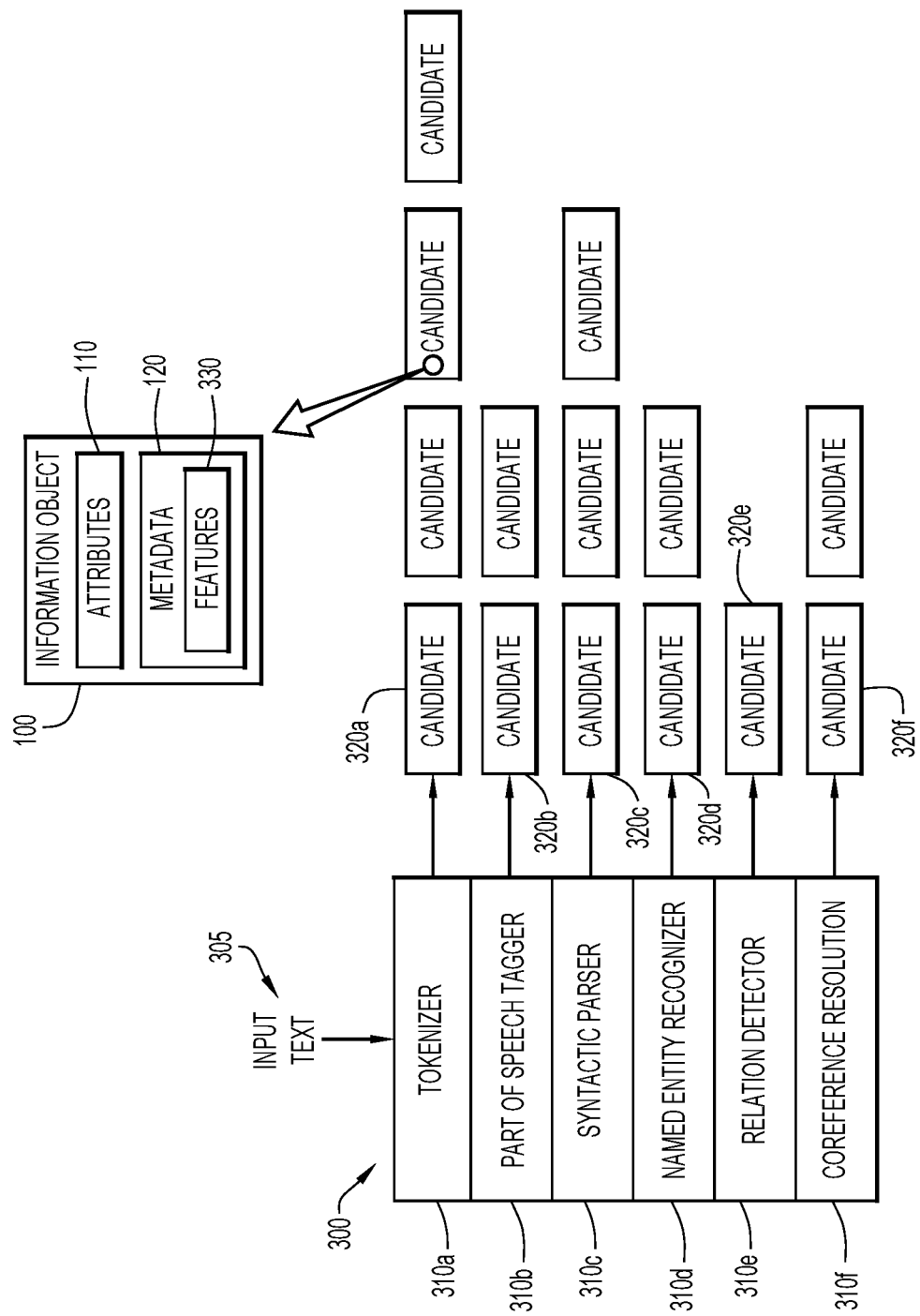
FIG. 3 is a diagram of a natural language core component by which the present invention can be embodied.

FIG. 3 is a block diagram of an example NLP core 300 that can be used in embodiments of the present invention. As illustrated in the figure, NLP core 300 may be a set of NLP core components 310: a tokenizer component 310a; a part-of-speech (POS) tagger component 310b; a syntactic parser component 310c; a named entity recognizer (NER) component 310d; a relation detector component 310e and a coreference resolver component 310f. The present invention is not limited to the particular NLP core components 310 illustrated in FIG. 3; they are apt examples of commonly used NLP processes that might be supported by NLP platform 22 for use in various NLP applications. Additionally, NLP core components 310 may be realized through publicly known algorithms and techniques, including open-source, commercial and proprietary software packages.

Example tokenizer component 310a identifies and describes (such as by suitably constructed information object 100) tokens (e.g., words, non-words, etc.) contained in input text 305. Depending on the application component of QA system 200 in which a particular NLP core 300 is utilized, input text 305 may be obtained from question 205 (for question analysis stage 210), text corpus 280 (for primary search stage 220) or evidence corpus 290 (for evidence retrieval stage 240) for further processing by NLP core 300.

As illustrated in FIG. 3, part-of-speech (POS) tagger component 310b may read text (input tokens) of some known language and may assign parts of speech to each word (and other tokens), such as noun, verb, adjective, adverb, noun-plural, etc.

Syntactic parser component 310c may analyze the parts of speech to identify grammatical structures, e.g., phrases, sentences, etc. Syntactic parser component 330 may determine, for example, which groups of words go together (as phrases) and which words are the subject or object of a verb. Probabilistic parsers use knowledge of language gained from previously-parsed sentences to try to produce the most likely analysis of new sentences.

Named entity recognizer (NER) component 310d recognizes named (e.g., persons, locations, organizations, etc.), numerical (e.g., money, numbers, ordinals, percent, etc.), and temporal (e.g., date, time, duration, set, etc.) entities. Named entities may be recognized using sequence taggers trained on various corpora.

Relation extractor component 310e finds relations between two entities (e.g. syntactic relations such as modifiers and verb subject/object, event frame relations such as participants, etc.) Most questions contain relations, whether they are syntactic subject-verb-object predicates or semantic relationships between entities.

Coreference resolver component 310f finds all expressions that refer to the same entity in a text. For example, coreference resolver component 310f may be configured to identify the words "Jack" and "his" in the sentence "Jack loves his dog," as referring to the same person. Techniques that resolve coreferences often look first for the nearest preceding object mention in the text that is compatible with the referring expression. However, other coreference resolving techniques can be used in conjunction with the present invention as well.

As illustrated in FIG. 3, each NLP core component 310 generates or otherwise produces candidate outputs, representatively referred to herein as candidate outputs 320. For example, tokenizer component 310a may produce candidate tokens 320a, POS tagger component 310b may produce candidate parts of speech 320b, syntactic parser component 310c may produce candidate grammatical structures 320c, named entity recognizer component 310d may produce candidate named entities 320d, relation detector component 310e may produce candidate relations 320e and coreference resolver component 310f may produce candidate equivalent entities 370f. Each candidate output 320 may be represented in information objects 100 as, for example, annotated or otherwise labeled text in both attributes 110, where applicable, and as metadata 120. Additionally, as illustrated in FIG. 3, each candidate output 320 may be characterized by one or more features 330, which may be stored in the metadata 120 of the corresponding information object 100. As used herein, a "feature" is a computer-readable item of information that represents some entity. In certain embodiments, each candidate output 320 may be characterized by a number of such features organized into a feature vector. When so embodied, each candidate output 320 can be evaluated as to its makeup by analyzing the corresponding feature vector. For purposes of description, features 330 will also be referred to herein as feature vector 330, although the present invention is not limited to vector representations.

Feature vectors 330 are informative and discriminating data on which machine learning techniques can proceed. When adapting an application to a new domain, feature vectors 330 should be carefully chosen or engineered to capture the semantics of the new domain so that, as a result of training, candidate answers pertaining to the new domain will be preferred, such as by a weighting technique, to those in other domains. Such feature vectors 330 and/or a feature generating function pertinent to the new domain may be constructed or otherwise configured as part of domain model 28.

As illustrated in FIG. 3, the number of candidate outputs 320 produced by any NLP core component 310 for a single input may be independent of the number of candidate outputs 320 produced by the other NLP core components 310. The number of candidate outputs 320 generated or otherwise produced by individual NLP core components 310 may be a user-configurable parameter.

When a candidate output 320 from one NLP core component 310 corresponds to a correct answer 207 at the output of QA system 200, then all of the candidate outputs 320 of the NLP core 300 in subsequent stages of QA system 200 must also be correct. These candidate outputs 320 may be given preference, such as by suitable weighting. When a candidate output 320 produces an incorrect answer 207, then that output 320 generated some candidate output 320 in another stage of QA system 200 that is incorrect. Accordingly, the offending original candidate output 320 can be avoided by applying suitable weights thereto.

Embodiments of the invention train, configure and utilize the components 310 of NLP core 300 to produce candidate outputs 320 that are more likely to lead to a correct answer to the question and to reduce the number of candidate outputs 320 that are less likely to lead to the correct answer. Such training is conventionally achieved through manual techniques by domain subject matter experts and information engineers. Advantageously, embodiments of the present invention achieve such training using feedback from the output of the application, e.g., QA system 200.

Figure 4A:
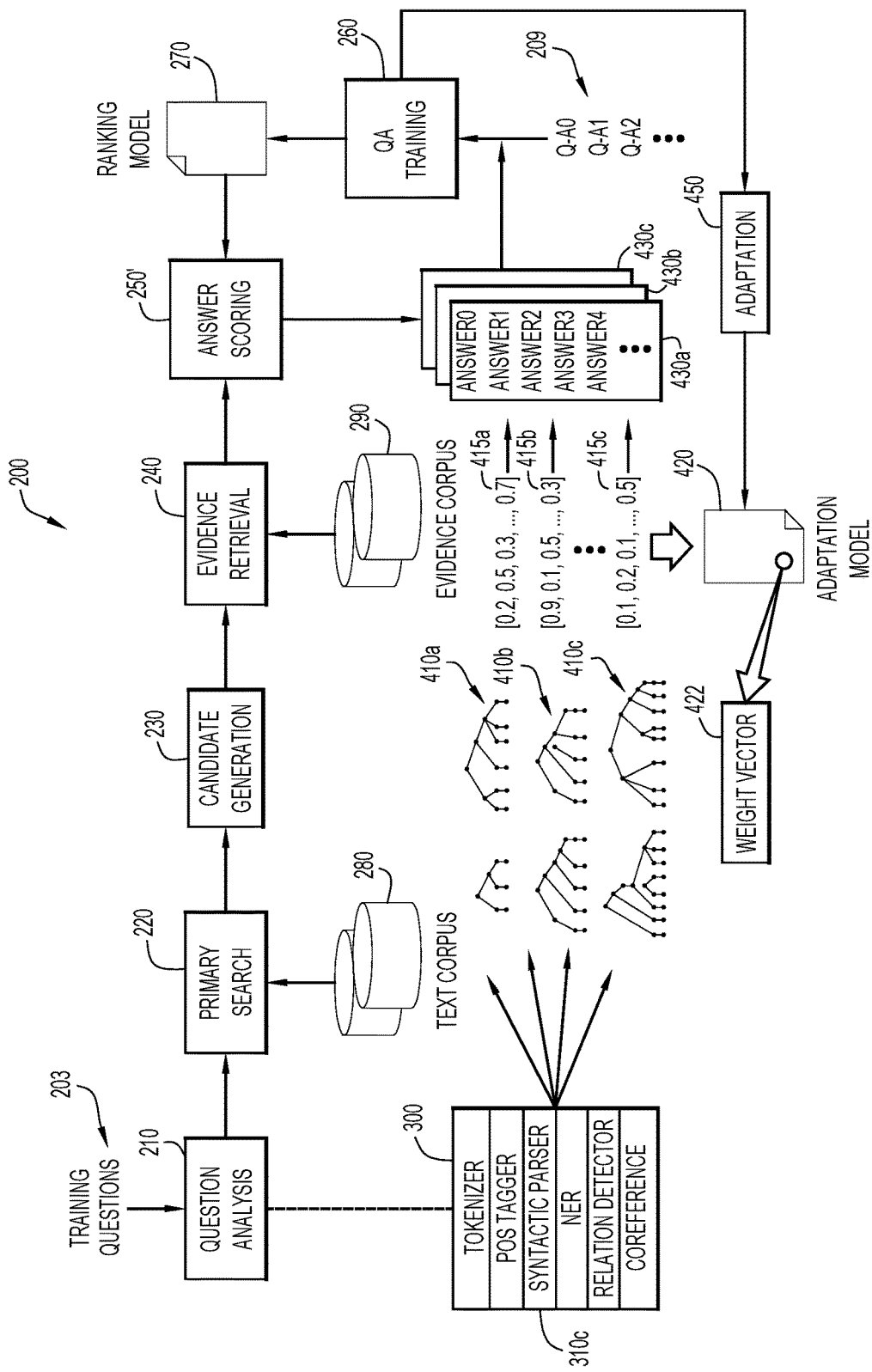
FIGS. 4A-4B are schematic block diagrams of component adaptation model training and runtime utilization in embodiments of the invention.
Figure 4B:
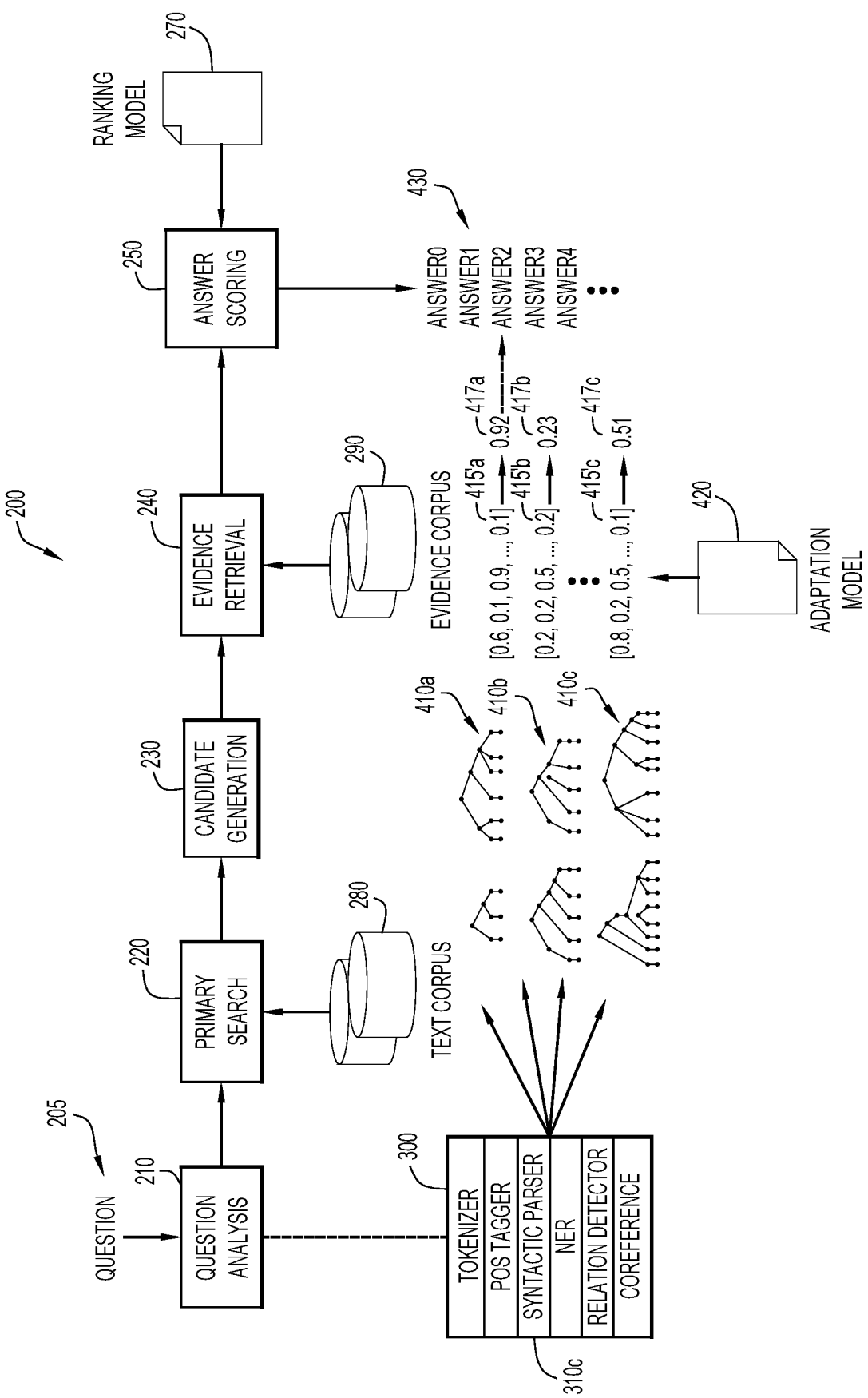

FIGS. 4A and 4B, collectively referred to herein as FIG. 4, are schematic block diagrams of QA system 200 in an example embodiment of the present invention, with FIG. 4A depicting a training mode and FIG. 4B depicting a runtime mode. In the training mode of FIG. 4A, each NLP core component 310 of each stage of QA system 200 is trained using feedback from the output of QA system 200 itself. If a candidate output 320 of an NLP core component 310 leads to a correct answer being produced by QA system 200, the candidate output 320 and/or its representative features may receive preferential processing, such as by higher weights. In certain embodiments, candidate outputs 320 of each NLP core component 310 is allowed to propagate through QA system 200 and can be linked to the answers from the QA system 200 to determine what answers 207 are produced for training questions 205 based on those candidates. The candidate answers may be evaluated per QA training procedures implemented by QA training stage 260. QA training stage 260, in addition to training ranking model 270, may provide information to an adaptation stage 450 that updates an adaptation model 420 for the NLP core component 310 being trained.

Adaptation stage 450 represents mechanisms by which application output, e.g., answer sets 430a-430c, representatively referred to as answer set(s) 430, and its relationship with ground truth data 209 are used to train individual NLP core components 310. Adaptation stage 450 may be constructed or otherwise configured, advantageously, to produce, modify and maintain an adaptation model 420 with which the NLP core components 310 operate in the new domain or application. For example, adaptation model 420 may contain weight vectors 422 that, when applied to candidate outputs 320 or feature vectors thereof through a weighting function using weight vectors 422, candidate outputs 320 that are most likely to result in a correct answer at the final application output are given preference over candidate outputs 320 that are less likely to produce correct answers at the application output.

As illustrated in FIG. 4A, training questions 203 from a new domain may be provided to QA analysis stage 210 and a set of parse trees 410a-410c, representatively referred to herein as parse tree(s) 410 are produced by syntactic parser component 310c of QA analysis stage 210. In the example illustrated, parse trees 410 are candidate outputs of syntactic parser 310c and represent grammatically linked text items, e.g., phrases, sentences, etc. Each parse tree 410 may be represented by a corresponding candidate feature vector 415a-415c, representatively referred to herein as feature vector(s) 415. In embodiments of the invention, each candidate feature vector 415 may be transformed by a suitable function or weighting technique configured in accordance with the output of the NLP application, e.g., QA system 200. In certain embodiments, the transformation may be achieved by weight vectors 422 that, when applied to candidate feature vector 415, e.g., by dot product, produces a score that indicates how a particular candidate parse tree 410 (and the corresponding feature vector 415) produces a correct answer at the application's output as determined by comparison with ground truth data 209.

Each candidate output 410 may be conveyed normally through remaining processing operations of QA system 200 to produce corresponding answer sets 430. In certain embodiments of the present invention, each candidate parse tree 410 may propagate through QA system 200 alone and separately from other candidate parse trees 410 to produce only the corresponding answer set 430. When so embodied, the answers in the corresponding answer set 430 are compared with and ranked against ground truth data 209, such as by QA training stage 260. Based on such analysis, QA training stage 260 may provide an indication to adaptation stage 450 as to whether the question was answered in accordance with ground truth data 209 with a certain degree of confidence. Accordingly, adaptation stage 450 may determine a suitable weighting scheme, e.g., weight vectors 422 and/or weighting function that, for example, increases a score for the candidate feature vector 415 resulting in a correct answer and decreases the score for the candidate feature vector 415 resulting in an incorrect answer.

In certain embodiments of the invention, adaptation stage 450 implements a logistic regression technique using binary category labels (correct/incorrect) of feature vectors 415. Logistic regression may be used to model the probability that a given feature vector will result in a correct answer at the output of QA system 200. A gradient descent technique may be used on the modeled statistics to determine weight vectors 422 that produce the best predictor of the application output (correct answer) given the feature vector 415. Such weight vectors 422 may be stored or made otherwise a part of adaptation model 420.

At runtime, as illustrated in FIG. 4B, each NLP core component 310 may be constructed or otherwise configured to produce a set of candidate outputs 410 for each input item in accordance with adaptation model 420. That is, the output of syntactic parser 310c is represented by an adapted feature vector 415' rather than the corresponding feature vector 415 illustrated in FIG. 4A. In certain embodiments, such is achieved by weighting feature vectors 415 by weight vectors 422 to produce respective adapted feature vectors 415'. In certain embodiments, a score 417 is computed for each of the outputs 410 and the adapted feature vector 415' of the candidate output 410 with the highest score 417 may be provided to the remaining processing of QA system 200.

Candidate outputs 320 of one or more NLP core components 310 may be related according to some criterion. For example, syntactic parser 310c may be configured to produce at its output the top N ranked parse trees as its candidate outputs. In certain embodiments of the present invention, candidate outputs 320 of one or more NLP core components 310 are made to be variations of one another. In other embodiments, domain-specific rules are established that mutate or perturb input data to generate candidate outputs 320. A linguistic rule may be established that says: "if a prepositional phrase is attached to a noun in this input parse tree, detach the prepositional phrase and connect it to the nearest 'ancestor' noun phrase, if available." This rule, when suitably applied to a candidate input parse tree, produces a new candidate parse tree that can supplement the original parse tree in a set of candidate outputs of syntactic parser component 310c. Rules for other NLP core components 310 can be similarly constructed and applied. For example, a rule may be established for NER component 310d, whereby an existing entity name is mutated or perturbed by increasing/decreasing the span size or by changing the entity name label, e.g., a rule may be established that produces COMPANY candidate NER spans for every PERSON NER span generated by NER component 310d.

The present invention is not limited to specific mechanisms to implement the adaptation described herein. For example, in certain embodiments, NLP core components 310 may be constructed or otherwise configured with internal adaptation and/or machine learning mechanisms. In other embodiments, NLP core components 310 may be commodity components for which adaptation is achieved by a machine-learning adaptation layer overlaid on the application across the application output and NLP core components. Upon review of this disclosure, those having skill in adaptive systems will recognize many different configurations by which the adaptation described herein can be achieved.

In the foregoing examples, each NLP core component 310 is trained independently of the other NLP core components 310. In certain implementations, however, the output of one NLP core component 310 is dependent on the output of another NLP core component 310. Certain embodiments of the present invention realize techniques by which such dependencies may be taken into account.

Figure 5:
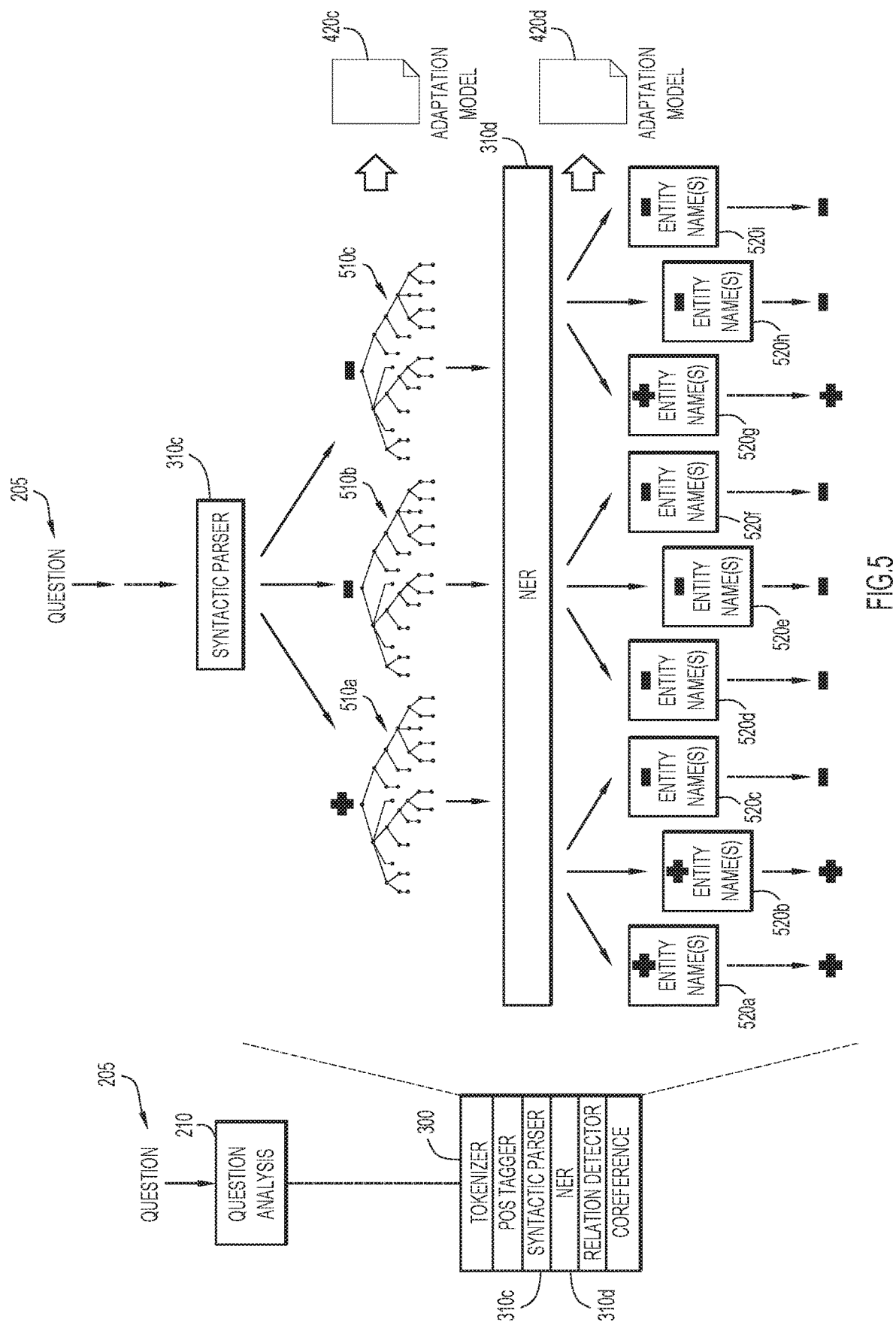
FIG. 5 is a block diagram of component adaptation training and runtime utilization of dependent components by which the present invention can be embodied.

FIG. 5 is a conceptual block diagram of training and utilizing dependent NLP core components 310 by embodiments of the present invention. In the illustrated example, it is assumed that the output of NER component 310d is dependent on the output generated or otherwise produced by syntactic parser component 310c. Additionally, it is assumed NER component 310d (or any other NLP core component 310) can be configured to produce a selectable number of candidate outputs 320 for every feature vector provided at its input. As illustrated in FIG. 5, example NER component 310d is configured to produce three (3) candidate outputs 320 from every one (1) input, which is the output of syntactic parser component 320c. Syntactic parser component 310c may produce three (3) parse trees 510a-510c, representatively referred to herein as parse trees 510, from question 205. Since NER component 310d produces three (3) recognized entity names 520 (or the feature vector representation thereof) for every parse tree 510 (or the feature vector representation thereof), a total of nine (9) candidate recognized entity names 520a-520i are produced by NER component 310d. In certain embodiments, the recognized entity names 520 branching from the same parse tree 510 may be identified as such, for example in metadata 120 of the corresponding information object 100. Accordingly, the origin parse tree 510 of each candidate recognized entity name 520 can be identified.

In certain embodiments, the nine (9) entity names 520 are conveyed through the remaining processing stages of QA system 200 for purposes of training (in lieu of conveying both parse trees and entity names independently through the processing stages of QA system 200) enabling collective adaption of multiple components. The candidate entity names 520 of NER 310d may be associated with the output from the application, indicating whether a correct answer was produced at the output of QA system 200 from that particular candidate entity name 520. In FIG. 5, a plus (+) symbol on a recognized entity name 520 indicates a correct answer result and a minus (−) symbol on a recognized entity name 520 indicates an incorrect answer result. As is illustrated in FIG. 5, parse tree 510a spawned two (2) recognized entity names 520a and 520b via NER component 310d that resulted in correct answers being generated at the output of QA system 200 and one (1) entity name 520c that resulted in an incorrect answer being generated. Parse tree 510c spawned one (1) entity name 520g via NER component 310d that resulted in a correct answer and two (2) entity names 520h and 520i that resulted in an incorrect answer.

Based on the results illustrated in FIG. 5, the parse tree 510a, which is labeled as producing correct answers, can be considered more accurate than the parser tree 510c, which produced fewer correct answers. Accordingly, the parse tree 510a and/or features thereof may be weighted more preferably at the output of syntactic parser 310c, and parse tree 510c may be weighted less preferably with respect to being generated by syntactic parser 310c without either having been a training case directly. No recognized entity names 520d-520f having parentage in syntactic parse tree 510b resulted in a correct answer. Accordingly, parse tree 510b may be weighted very low. Such weighting may be reflected in component adaptation models 420c and 420d for syntactic parser component 310c and NER component 310d, respectively.

In FIG. 5, multiple parse trees 510 are produced for a given question 205, and for each parse tree 510, multiple entity name outputs 520 are produced. Each candidate output 320, e.g., each parse tree 510 and each entity name 520, when processed by the application, e.g., QA system 200, eventually leads to a different output answer of QA system 200 as a whole. Thus, instead of a single path through the system from question 205 to an answer 207, embodiments of the invention create many (nine (9), in the illustrated example) paths to an answer. In the generalized case of many different components throughout the system, hundreds (or thousands) of such paths to different answers can be created. However, it can be observed from FIG. 5 that some subset of the parse trees 510 eventually led QA system 200 to produce the right answer, i.e., the paths marked with pluses (+) in FIG. 5, and another subset of the parse trees 510 eventually led QA system 200 to produce a wrong answer, i.e., the paths marked with minuses (−). All candidate outputs 310 associated with a plus (+) may be utilized as positive examples for purposes of machine learning and all candidates associated with a minus (−) may be utilized as negative examples.

In the multiplicative scenario above, i.e., three (3) results from syntactic parser component 310c×three (3) results from NER component 310d, the number of candidate outputs can grow very rapidly. In many real applications, the number of results produced by each NLP core component 310 is typically much larger than three (3). When the present invention is generalized to a stack of many NLP core components 310, each producing a set of candidate outputs 320 for each input from the upstream NLP core component 310, it will be readily recognized that the number of paths to an answer through QA system 200 can become a very, very large number of paths. However, if only a subset of those many paths are associated with a threshold likelihood of success, removing those paths having low scores, while perhaps not increasing the efficiency of the inventive adaptation technique, may increase the speed of adaptation significantly. To reduce the burden of evaluating a large number of paths, beam search pruning or similar technique may be deployed. In certain embodiments, such beam search pruning restricts the total number of candidate outputs 320 from each NLP core component 310 in the stack to a specific number N (e.g., 3). In certain embodiments, the top N (e.g., 3) of a plurality of candidate outputs 320, after ranking them using a scoring function, such as a dot-product. Another pruning implementation determines whether a certain input (parse tree) does not spawn a certain number of dependent candidate outputs (recognized entity names) that produce a correct answer.

Figure 6A:
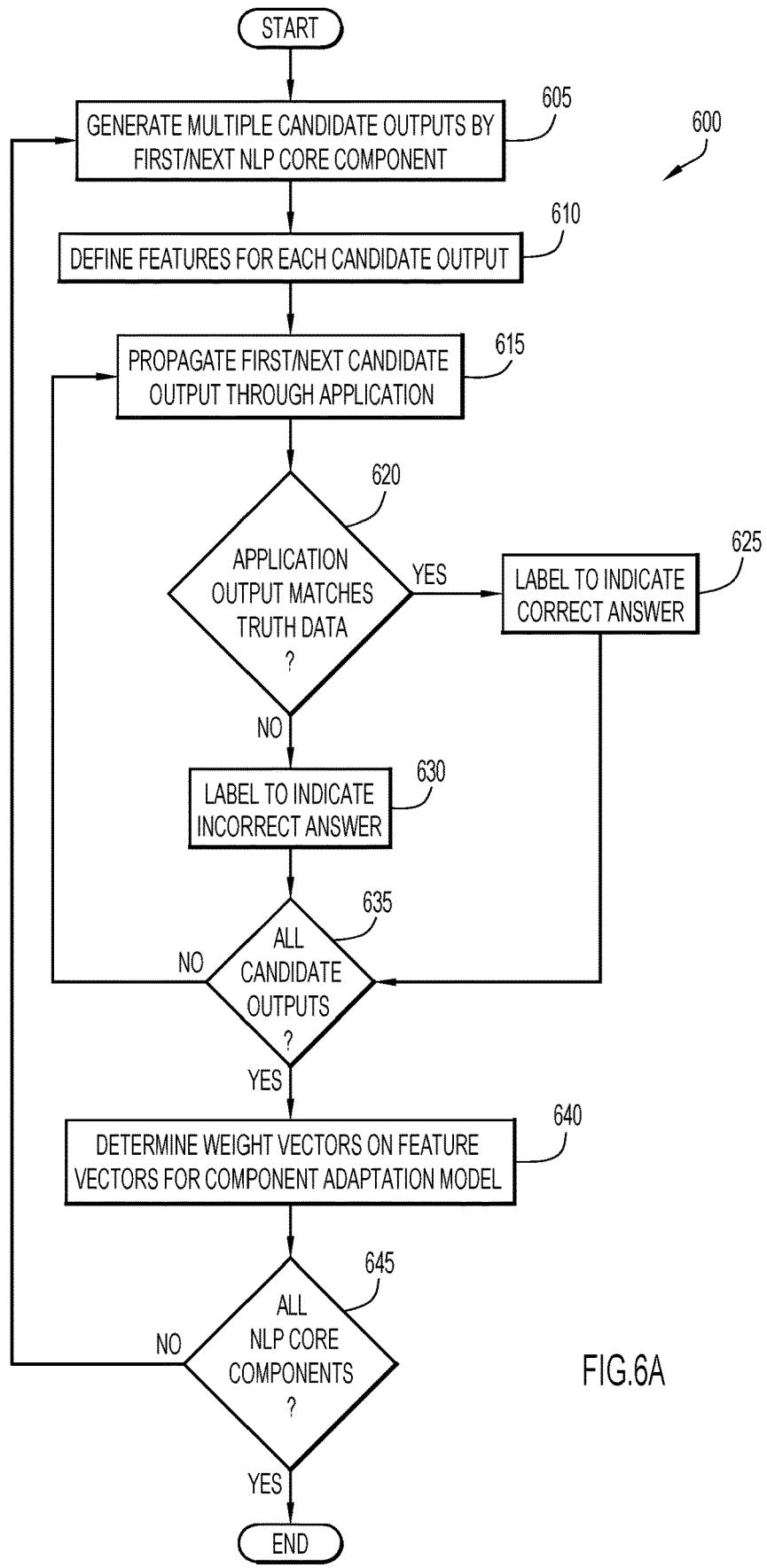
FIGS. 6A-6B are flow diagrams of component training and runtime operation processes by which the present invention can be embodied.
Figure 6B:
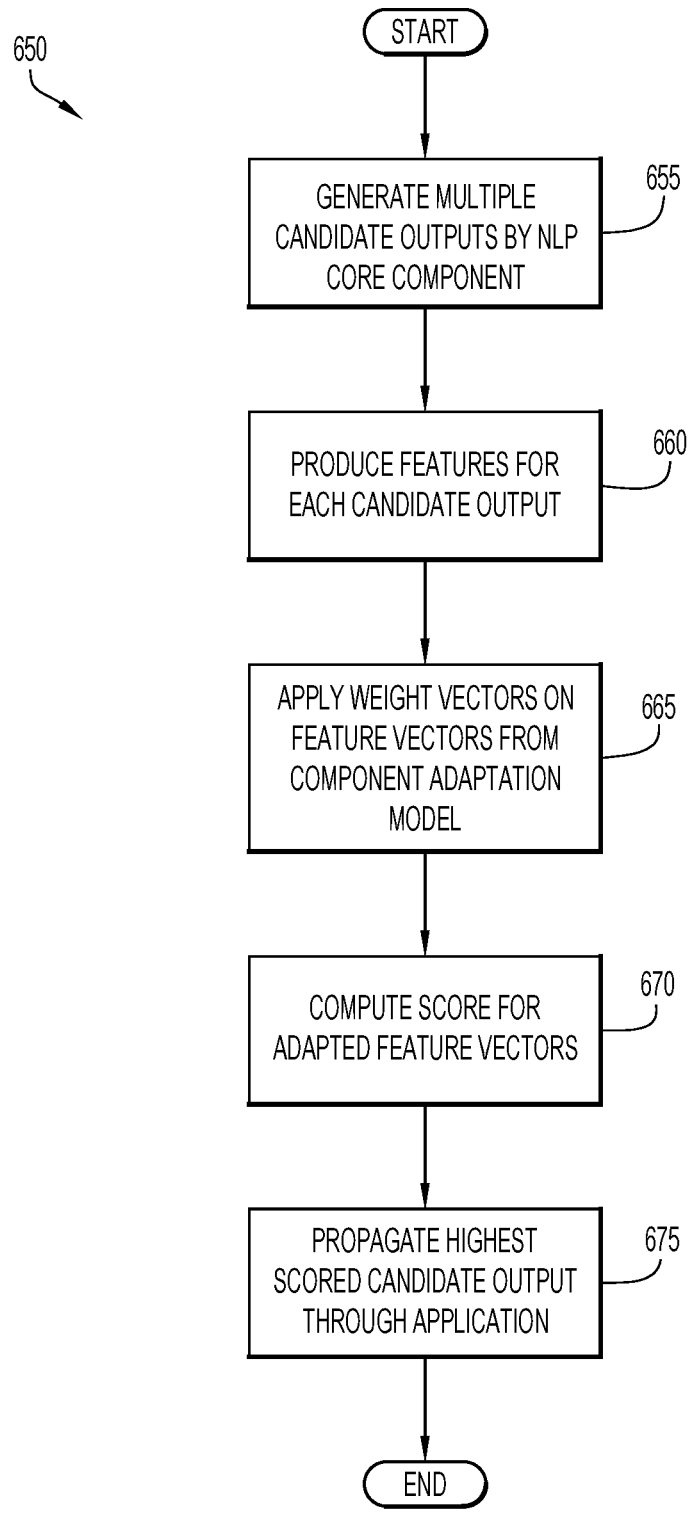

FIGS. 6A-6B are flow diagrams of a training process 600 and of a runtime process 650, respectively, by which the present invention can be embodied. As illustrated in FIG. 6A, example training process 600 may generate multiple candidate outputs by a first NLP core component in operation 605. In certain embodiments, each NLP core component is constructed or otherwise configured to generate multiple candidate outputs that are small variations of the primary output. This can be done through newly created rules, or though reconfiguration of existing NLP components.

In operation 610, features, e.g., feature vectors, may be defined for each candidate output. In operation 615, the first candidate output is provided to the application for processing and in operation 620, it is determined whether the application output for that candidate output matches ground truth data. If so, a label is applied indicating that the corresponding candidate output produced a correct answer in operation 625. Otherwise, if the application output does not match ground truth data as determined in operation 620, a label is applied indicating that the corresponding output produced an incorrect answer in operation 630. In operation 635, it is determined whether all candidate outputs have propagated through the application and, if not, example process 600 transitions back to operation 615, whereby the next candidate output is propagated through the application. If all candidate outputs have propagated through the application, as determined at operation 635, process 600 transitions to operation 640, by which weight vectors are determined for a component adaptation model by which features or sets of features generated by that component result in ground truth are preferably weighted over features and sets of features that do not result in ground truth. Such weighting determination may be achieved through, for example, logistic regression using gradient descent, as described above. In operation 645, it is determined whether candidate outputs from all NLP core components have been evaluated. If so, training process 600 may terminate; otherwise, training process 600 may transition back to operation 605, by which candidate outputs are generated by the next NLP core component.

As illustrated in FIG. 6B, at runtime in operation 655, runtime process 650 may generate multiple candidate outputs related to the application input (question) at a first NLP core component. In operation 660, features are produced that correspond to each candidate output. The weight vectors determined during training are applied from the component adaptation model to the feature vectors in operation 665. In operation 670, a score is computed from the adapted feature vectors and, in operation 675, the highest scored candidate output propagates through the application to generate an output thereof.

Client systems 14 enable users to submit documents (e.g., training questions 207, question 205, ground truth data 209, etc.) to server systems 12. The server systems include an NLP platform 22 to process unstructured information into structured information and to otherwise support the execution of NLP applications using adaptable components thereof (e.g., NLP core components 310). A database system, e.g., DB 24, may store various information for the analysis (e.g., information objects, ground truth data, evidence, models, etc.). The database system may be implemented by any conventional or other database or storage unit, may be local to or remote from server systems 12 and client systems 14, and may communicate via any appropriate communication medium (e.g., local area network (LAN), wide area network (WAN), Internet, hardwire, wireless link, Intranet, etc.). The client systems may present a graphical user (e.g., GUI, etc.) or other interface (e.g., command line prompts, menu screens, etc.) to solicit information from users pertaining to analyses and user lines of inquiry, and may provide reports including analysis results (e.g., text analytics, answers, etc.).

NLP platform 22 may include one or more modules or units to perform the various functions of present invention embodiments described above. The various components (e.g., question analysis component 210, primary search component 220, candidate generation component 230, evidence retrieval component 240, answer scoring and ranking component 250, QA training component 260, adaptation component 450, NLP core components 310, etc.) may be implemented by any combination of any quantity of software and/or hardware modules or units, and may reside within memory of the server and/or client systems for execution by a processor.

It will be appreciated that the embodiments described above and illustrated in the drawings represent only a few of the many ways of implementing training and utilization of adaptable NLP components.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, NLP processing module, etc.). These systems may include any types of monitors and input devices (e.g., keyboard, mouse, voice recognition, etc.) to enter and/or view information.

It is to be understood that the software (e.g., NLP platform, NLP applications, NLP application components, NLP application training components, adaptation components, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., NLP platform, NLP applications, NLP application components, NLP application training components, adaptation components, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The database system may employ any number of any conventional or other databases, data stores or storage structures (e.g., files, databases, data structures, data or other repositories, etc.) to store information (e.g., information objects, answers, evidence, models, etc.). The database system may be implemented by any number of any conventional or other databases, data stores or storage structures (e.g., files, databases, data structures, data or other repositories, etc.) to store information (e.g., information objects, answers, evidence, models, etc.). The database system may be included within or coupled to the server and/or client systems. The database systems and/or storage structures may be remote from or local to the computer or other processing systems, and may store any desired data (e.g., information objects, conclusions, evidence, models, etc.).

The present invention embodiments may employ any number of any type of user interface (e.g., Graphical User Interface (GUI), command-line, prompt, etc.) for obtaining or providing information (e.g., training questions 207, question 205, ground truth data 209, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria (e.g., constraints, user profiles, etc.) to provide desired information to a user (e.g., text analytics, answers, etc.).

The present invention embodiments are not limited to the specific tasks or algorithms described above, but may be utilized for other domains, such as finances, legal analysis, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of configuring a processing system with an application including a natural language processing core utilizing a plurality of machine learning components, the method comprising:

training each machine learning component of the plurality of machine learning components individually with respective training data for subject matter of a first domain to perform a corresponding natural language processing task;

training the application on an initial set of training data for the subject matter of the first domain;

executing the application with the trained machine learning components on the processing system using another set of training data for different subject matter of a second different domain to produce a plurality of different outputs from the application for each of a plurality of elements of the other set of training data, wherein each different output from the application is based on a corresponding one of a first plurality of candidate outputs generated for each of the elements by a trained machine learning component of the plurality of trained machine learning components performing the corresponding natural language processing task;

identifying, for each of the elements of the other set of training data, one or more outputs of the application among the different outputs of the application that concur with ground truth data;

identifying the candidate outputs of the trained machine learning component that produce the identified outputs concurring with the ground truth data;

weighting each of the first plurality of candidate outputs of the trained machine learning component, wherein weighting for the identified candidate outputs is greater relative to weighting for other candidate outputs, and the weighting each of the first plurality of candidate outputs comprises:

training a component model for the trained machine learning component to produce weight vectors for the first plurality of candidate outputs and updating the component model to adjust the weight vectors based on the identified outputs of the application; and applying corresponding weight vectors of the component model to feature vectors of the first plurality of candidate outputs to produce a score for each of the first plurality of candidate outputs; and adapting the natural language processing core to the second different domain by adapting the plurality of trained machine learning components to select based on the weighting score, a candidate output from the trained machine learning component that provides an identified output concurring with the ground truth data and to propagate the selected candidate output through remaining machine learning components to produce a result of the application for an inquiry of the different subject matter of the different second domain.

2. The method of claim 1, further comprising:

generating the first plurality of candidate outputs from each of the plurality of machine learning components based on the other set of training data; and training a component model for each of the plurality of machine learning components by executing the application for each of the first plurality of candidate outputs generated from that component and adjusting the component model for that component based on results produced by the application.

3. The method of claim 2, further comprising:

executing the application with the trained component model for each of the plurality of machine learning components by:

generating a second plurality of candidate outputs from each machine learning component;

applying the trained component model for each machine learning component to select a candidate output for that component from among the second plurality of candidate outputs generated from that component; and executing the application utilizing the selected candidate output for each of the plurality of machine learning components.

4. The method of claim 2, wherein generating the first plurality of candidate outputs comprises:

generating the first plurality of candidate outputs as being variations of a primary candidate output.

5. The method of claim 2, further comprising:
determining features for the first plurality of candidate outputs generated from each of the plurality of machine learning components;
wherein training a component model for each of the plurality of machine learning components includes weighting the features of each of the first plurality of candidate outputs generated from that component based on results produced by the application to enable the selection of a candidate output from that component for the application.

6. The method of claim 1, further comprising:
training a component model for a set of the machine learning components by executing the application with one from each of a plurality of candidate outputs generated from the set of machine learning components and adjusting the component model for the set of machine learning components based on results produced by the application; and
executing the application with the trained component model for the set of machine learning components.

7. The method of claim 2, wherein the component model for each of the plurality of machine learning components is trained based on output from the application in response to a new domain for the application.

8. An apparatus to configure a processing system with an application including a natural language processing core utilizing a plurality of machine learning components, the apparatus comprising:
a processor configured to:
train each machine learning component of the plurality of machine learning components individually with respective training data for subject matter of a first domain to perform a corresponding natural language processing task;
train the application on an initial set of training data for the subject matter of the first domain;
execute the application with the trained machine learning components on the processing system using another set of training data for different subject matter of a second different domain to produce a plurality of different outputs from the application for each of a plurality of elements of the other set of training data, wherein each different output from the application is based on a corresponding one of a first plurality of candidate outputs generated for each of the elements by a trained machine learning component of the plurality of trained machine learning components performing the corresponding natural language processing task;
identify, for each of the elements of the other set of training data, one or more outputs of the application among the different outputs of the application that concur with ground truth data;
identify the candidate outputs of the trained machine learning component that produce the identified outputs concurring with the ground truth data;
weight each of the first plurality of candidate outputs of the trained machine learning component, wherein weighting for the identified candidate outputs is greater relative to weighting for other candidate outputs, and the weighting each of the first plurality of candidate outputs comprises:
training a component model for the trained machine learning component to produce weight vectors for the first plurality of candidate outputs and updating the component model to adjust the weight vectors based on the identified outputs of the application; and
applying corresponding weight vectors of the component model to feature vectors of the first plurality of candidate outputs to produce a score for each of the first plurality of candidate outputs; and
adapt the natural language processing core to the second different domain by adapting the plurality of trained machine learning components to select based on the score, a candidate output from the trained machine learning component that provides an identified output concurring with the ground truth data and to propagate the selected candidate output through remaining machine learning components to produce a result of the application for an inquiry of the different subject matter of the different second domain.

9. The apparatus of claim 8, further comprising:
a data storage unit configured to store component models for the machine learning components; and wherein the processor is further configured to:
generate the first plurality of candidate outputs from each of the plurality of machine learning components based on the other set of training data; and
train a component model for each of the plurality of machine learning components by executing the application for each of the first plurality of candidate outputs generated from that component and adjusting the component model for that component based on results produced by the application.

10. The apparatus of claim 9, wherein the processor is further configured to:
generate a second plurality of candidate outputs from each machine learning component;
apply the trained component model for each machine learning component to select a candidate output for that component from among the second plurality of candidate outputs generated from that component; and
execute the application utilizing the selected candidate output for each of the plurality of machine learning components.

11. The apparatus of claim 9, wherein the processor is further configured to:
generate the first plurality of candidate outputs as being variations of a primary candidate output.

12. The apparatus of claim 9, wherein the processor is further configured to:
determine features for the first plurality of candidate outputs generated from each of the plurality of machine learning components; and
weight the features of each of the first plurality of candidate outputs generated from that component based on results produced by the application to enable the selection of a candidate output from that component for the application.

13. The apparatus of claim 8, wherein the processor is further configured to:
train a component model for a set of the machine learning components by executing the application with one from each of a plurality of candidate outputs generated from the set of machine learning components and adjusting the component model for the set of machine learning components based on results produced by the application; and
execute the application with the trained component model for the set of machine learning components.

14. The apparatus of claim 9, wherein the component model for each of the plurality of machine learning components is trained based on output from the application in response to a new domain for the application.

15. A computer program product for configuring a processing system with an application including a natural language processing core utilizing a plurality of machine learning components, the computer program product comprising one or more computer readable storage media collectively having program instructions embodied therewith, the program instructions executable by a processor to cause the processor to:
- train each machine learning component of the plurality of machine learning components individually with respective training data for subject matter of a first domain to perform a corresponding natural language processing task;
- train the application on an initial set of training data for the subject matter of the first domain;
- execute the application with the trained machine learning components on the processing system using another set of training data for different subject matter of a second different domain to produce a plurality of different outputs from the application for each of a plurality of elements of the other set of training data, wherein each different output from the application is based on a corresponding one of a first plurality of candidate outputs generated for each of the elements by a trained machine learning component of the plurality of trained machine learning components performing the corresponding natural language processing task;
- identify, for each of the elements of the other set of training data, one or more outputs of the application among the different outputs of the application that concur with ground truth data;
- identify the candidate outputs of the trained machine learning component that produce the identified outputs concurring with the ground truth data;
- weight each of the first plurality of candidate outputs of the trained machine learning component, wherein weighting for the identified candidate outputs is greater relative to weighting for other candidate outputs, and the weighting each of the first plurality of candidate outputs comprises:
  - training a component model for the trained machine learning component to produce weight vectors for the first plurality of candidate outputs and updating the component model to adjust the weight vectors based on the identified outputs of the application; and
  - applying corresponding weight vectors of the component model to feature vectors of the first plurality of candidate outputs to produce a score for each of the first plurality of candidate outputs; and
- adapt the natural language processing core to the second different domain by adapting the plurality of trained machine learning components to select based on the score, a candidate output from the trained machine learning component that provides an identified output concurring with the ground truth data and to propagate the selected candidate output through remaining machine learning components to produce a result of the application for an inquiry of the different subject matter of the different second domain.

16. The computer program product of claim 15, wherein the program instructions include further program instructions executable by the processor to cause the processor to:
- generate the first plurality of candidate outputs from each of the plurality of machine learning components based on the other set of training data; and
- train a component model for each of the plurality of machine learning components by executing the application for each of the first plurality of candidate outputs generated from that component and adjusting the component model for that component based on results produced by the application.

17. The computer program product of claim 16, wherein the program instructions include further program instructions executable by the processor to cause the processor to:
- generate a second plurality of candidate outputs from each machine learning component;
- apply the trained component model for each machine learning component to select a candidate output for that component from among the second plurality of candidate outputs generated from that component; and
- execute the application utilizing the selected candidate output for each of the plurality of machine learning components.

18. The computer program product of claim 16, wherein the program instructions include further program instructions executable by the processor to cause the processor to:
- generate the first plurality of candidate outputs as being variations of a primary candidate output.

19. The computer program product of claim 16, wherein the program instructions include further program instructions executable by the processor to cause the processor to:
- determine features for the first plurality of candidate outputs generated from each of the plurality of machine learning components; and
- weight the features of each of the first plurality of candidate outputs generated from that component based on results produced by the application to enable the selection of a candidate output from that component for the application.

* * * * *